US011947960B2

(12) United States Patent
Park et al.

(10) Patent No.: US 11,947,960 B2
(45) Date of Patent: Apr. 2, 2024

(54) MODULO-SPACE PROCESSING IN MULTIPLY-AND-ACCUMULATE UNITS

(71) Applicant: QUALCOMM Incorporated, San Diego, CA (US)

(72) Inventors: Edwin Chongwoo Park, San Diego, CA (US); Ravishankar Sivalingam, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/052,774

(22) Filed: Nov. 4, 2022

(65) Prior Publication Data

US 2023/0144950 A1    May 11, 2023

Related U.S. Application Data

(60) Provisional application No. 63/276,518, filed on Nov. 5, 2021.

(51) Int. Cl.
  *G06F 9/30*    (2018.01)
  *G06F 7/544*   (2006.01)

(52) U.S. Cl.
  CPC .......... *G06F 9/3001* (2013.01); *G06F 7/5443* (2013.01)

(58) Field of Classification Search
  None
  See application file for complete search history.

(56) References Cited

U.S. PATENT DOCUMENTS

| 2015/0106414 A1* | 4/2015 | Olsen ..................... H03M 7/18 |
| | | 708/204 |
| 2016/0342393 A1* | 11/2016 | Kossel ..................... G06F 7/57 |
| 2019/0138899 A1* | 5/2019 | Hoshizuki ............... G06N 3/08 |
| 2021/0174182 A1* | 6/2021 | Greenberg ............ G06N 3/084 |

FOREIGN PATENT DOCUMENTS

EP    3355247 A1    8/2018

OTHER PUBLICATIONS

Gorodecky, D., et al., (paper entitled Hardware realization of residue number system algorithms by Boolean functions minimization, 2018, arXiv, 9 pages. (Year: 2018).*
Salamat, S. et al., RNSnet: In-Memroy Neural Network Acceleration Using Residue Number System, 2018, IEEE, 12 pages. (Year: 2018).*

(Continued)

*Primary Examiner* — Eric Coleman
(74) *Attorney, Agent, or Firm* — Patterson & Sheridan LLP

(57) ABSTRACT

Certain aspects of the present disclosure provide techniques and apparatus for performing mathematical operations on processing units based on data in the modulo space. An example method includes receiving a binary-space input to process (e.g., using a neural network or other processing system). The binary-space input is converted into a modulo-space input based on a set of coprimes defined for executing operations in a modulo space. A modulo-space result is generated through one or more modulo-space multiply-and-accumulate (MAC) units based on the modulo-space input. The modulo-space result is converted into a binary-space result, and the binary-space result is output.

28 Claims, 7 Drawing Sheets

(56) References Cited

OTHER PUBLICATIONS

Lyakhov, P., et al., High-Performance Digital Filtering on Truncated Multiply-Accumulate Units in the Residue Number System, 2020, IEEE, pp. 209181-209190. (Year: 2020).*

Chervyakov N.I., et al., "Residue Number System-Based Solution for Reducing the Hardware Cost of a Convolutional Neural Network", Neurocomputing, Elsevier, Amsterdam, NL, vol. 407, May 18, 2020 (May 18, 2020), pp. 439-453, XP086237955, ISSN: 0925-2312, DOI: 10.1016/J.NEUCOM.2020.04.018 [retrieved on May 18, 2020] abstract, section 4.

Gorodecky D., et al., "Hardware Realization of Residue Number System Algorithms by Boolean Functions Minimization", ARXIV. ORG, Cornell University Library, 201 Olin Library Cornell University Ithaca, NY, 14853, Aug. 9, 2018 (Aug. 9, 2018), 9 Pages, XP080902944, abstract, section 2.2.

International Search Report and Written Opinion—PCT/US2022/079353—ISA/EPO—dated Feb. 27, 2023.

Roohi A., et al., "RNSIM: Efficient Deep Neural Network Accelerator Using Residue Number Systems", 2021 IEEE/ACM International Conference on Computer Aided Design (ICCAD), IEEE, Nov. 1, 2021 (Nov. 1, 2021), pp. 1-9, XP034057584, DOI: 10.1109/ICCAD51958.2021.9643531, [retrieved on Aug. 12, 2021] abstract, sections I, II, III, figures 1, 2.

Salamat S., et al., "RNSnet: In-Memory Neural Network Acceleration Using Residue No. System", 2018 IEEE International Conference on Rebooting Computing (ICRC), IEEE, Nov. 7, 2018 (Nov. 7, 2018), pp. 1-12, XP033516474, DOI: 10.1109/ICRC.2018.8638592 [retrieved on Aug. 2, 2019] abstract, sections II.B, III, figures 2, 4.

Horowitz M., "Computing's Energy Problem: (and what we can do about it)," International Solid-State Circuits Conference, 2014, IEEE, 46 pages.

Horowitz M., "Computing's Energy Problem (and what we can do about it)", 2014 IEEE International Solid-State Circuits Conference, ISSCC 2014 / Session 1 / Plenary / 1.1, Feb. 10, 2014, pp. 10-14.

ISSCC: "Vimeo Video: ISSCC 2014 Plenary Session 1", Jul. 2, 2014, 7 pages, URL: https://vimeo.com/99757212.

* cited by examiner

| MODULI BITWIDTH | # BRANCHES | DYNAMIC RANGE (M) | DYNAMIC RANGE (BITS) | TOTAL BRANCH BITS | COPRIMES, OR MODULI |
|---|---|---|---|---|---|
| 2 | 2 | 12 | 3 | 4 | 3, 4 |
| 3 | 2 | 56 | 5 | 6 | 7, 8 |
| 3 | 3 | 280 | 8 | 9 | 5, 7, 8 |
| 3 | 4 | 840 | 9 | 12 | 3, 5, 7, 8 |
| 4 | 2 | 240 | 7 | 8 | 15, 16 |
| 4 | 3 | 3120 | 11 | 12 | 13, 15, 16 |
| 4 | 4 | 34320 | 15 | 16 | 11, 13, 15, 16 |
| 4 | 5 | 240240 | 17 | 20 | 7, 11, 13, 15, 16 |
| 4 | 6 | 720720 | 19 | 24 | 5, 7, 9, 11, 13, 16 |
| 5 | 2 | 992 | 9 | 10 | 31, 32 |
| 5 | 3 | 28768 | 14 | 15 | 29, 31, 32 |
| 5 | 4 | 776736 | 19 | 20 | 27, 29, 31, 32 |
| 5 | 5 | 19418400 | 24 | 25 | 25, 27, 29, 31, 32 |
| 5 | 6 | 446623200 | 28 | 30 | 23, 25, 27, 29, 31, 32 |
| 5 | 7 | 8485840800 | 32 | 35 | 19, 23, 25, 27, 29, 31, 32 |
| 5 | 8 | 144259293600 | 37 | 40 | 17, 19, 23, 25, 27, 29, 31, 32 |
| 5 | 9 | 1875370816800 | 40 | 45 | 13, 17, 19, 23, 25, 27, 29, 31, 32 |
| 5 | 10 | 20629078984800 | 44 | 50 | 11, 13, 17, 19, 23, 25, 27, 29, 31, 32 |
| 5 | 11 | 144403552893600 | 47 | 55 | 7, 11, 13, 17, 19, 23, 25, 27, 29, 31, 32 |

*FIG. 1A*

| | | | | |
|---|---|---|---|---|
| 6 | 4032 | | 2 | 63, 64 |
| 6 | 245952 | | 3 | 61, 63, 64 |
| 6 | 14511168 | | 4 | 59, 61, 63, 64 |
| 6 | 798114240 | | 5 | 55, 59, 61, 63, 64 |
| 6 | 42300054720 | | 6 | 53, 55, 59, 61, 63, 64 |
| 6 | 1875302425920 | | 7 | 49, 53, 55, 57, 59, 61, 64 |
| 6 | 88139214018240 | | 8 | 47, 49, 53, 55, 57, 59, 61, 64 |
| 6 | 3789986202784320 | | 9 | 43, 47, 49, 53, 55, 57, 59, 61, 64 |
| 6 | 155389434314157120 | | 10 | 41, 43, 47, 49, 53, 55, 57, 59, 61, 64 |
| 6 | 5749409069623813440 | | 11 | 37, 41, 43, 47, 49, 53, 55, 57, 59, 61, 64 |
| 6 | 178231681153591808282560 | | 12 | 31, 37, 41, 43, 47, 49, 53, 55, 57, 59, 61, 64 |
| 6 | 5168718753591808282560 | | 13 | 29, 31, 37, 41, 43, 47, 49, 53, 55, 57, 59, 61, 64 |
| 6 | 118880531332611590498880 | | 14 | 23, 29, 31, 37, 41, 43, 47, 49, 53, 55, 57, 59, 61, 64 |
| 6 | 2020969032654397038480960 | | 15 | 19, 23, 29, 31, 37, 41, 43, 47, 49, 51, 53, 55, 59, 61, 64 |
| 6 | 26272597424507161500252480 | | 16 | 17, 19, 23, 29, 31, 37, 39, 41, 43, 47, 49, 53, 55, 59, 61, 64 |
| 6 | 236453376820564453502272320 | | 17 | 13, 17, 19, 23, 27, 29, 31, 37, 41, 43, 47, 49, 53, 55, 59, 61, 64 |
| 6 | 1182266884102822267511361600 | | 18 | 11, 13, 17, 19, 23, 25, 27, 29, 31, 37, 41, 43, 47, 49, 53, 59, 61, 64 |

*FIG. 1B*

MODULO-SPACE PROCESSING IN MULTIPLY-AND-ACCUMULATE UNITS

CROSS-REFERENCE TO RELATED APPLICATIONS

This application claims the benefit of and priority to U.S. Provisional Patent Application Ser. No. 63/276,518, entitled "Modulo Space Processing in Multiply-and-Accumulate Units," filed Nov. 5, 2021, and assigned to the assignee hereof, the entire contents of which are hereby incorporated by reference herein.

INTRODUCTION

Aspects of the present disclosure relate to multiply-and-accumulate units, which may be used for processing machine learning data.

Machine learning is generally the process of producing a trained model (e.g., an artificial neural network, a tree, or other structures), which represents a generalized fit to a set of training data. Applying the trained model to input data produces inferences, which may be used to gain insights into the input data. In some cases, applying the model to the input data is described as "running an inference" or "performing an inference" on the input data.

To train a model and perform inferences on input data, various mathematical operations are performed using various mathematical processing components. For example, multiply-and-accumulate (MAC) units may be used to perform these operations to train a model and perform inferences on input data using the trained model. It should be noted, however, that MAC units may be used for various mathematical operations and are not so limited to use in mathematical operations related to training a model and performing inferences on input data. These mathematical operations may be performed on various types of numerical data with varying complexity. Generally, the complexity of these operations may scale with the bit size of the data and the type of the data. For example, operations using 8-bit integers may be less computationally complex than performing an inference using larger sized integers, such as 64-bit integers. Similarly, operations using a given bit size of integers may be less computationally complex than operations using the given bit size of floating point numbers (e.g., operations performed using 32-bit integers may be less computationally complex than operations using 32-bit floating point numbers, even though the data is the same size in bits).

Power utilization, thermal output, and processing time generally scale with computational complexity. That is, less computationally complex operations generally consume less power and are completed more quickly than more computationally complex operations. Consequently, the execution of more computationally complex operations may result in reduced battery life and delays in the ability to reassign computing resources (e.g., compute cores on a processor, memory, etc.) to other tasks executing on a device.

Accordingly, what is needed are improved techniques for performing MAC operations more efficiently.

BRIEF SUMMARY

Certain aspects provide a method for performing inferences using a neural network. An example method includes receiving a binary-space input to process. The binary-space input is converted into a modulo-space input based on a set of coprimes defined for executing operations in a modulo space. A modulo-space result is generated through one or more modulo-space multiply-and-accumulate (MAC) units based on the modulo-space input. The modulo-space result is converted into a binary-space result, and the binary-space result is output.

Other aspects provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

BRIEF DESCRIPTION OF THE DRAWINGS

The appended figures depict certain features of one or more aspects of the present disclosure and are therefore not to be considered limiting of the scope of this disclosure.

FIGS. 1A and 1B depict examples of sets of coprimes that can be used in converting an input into the modulo space and to perform mathematical operations in the modulo space, according to aspects of the present disclosure.

To facilitate understanding, identical reference numerals have been used, where possible, to designate identical elements that are common to the drawings. It is contemplated that elements and features of one aspect may be beneficially incorporated in other aspects without further recitation.

DETAILED DESCRIPTION

Figure 2:
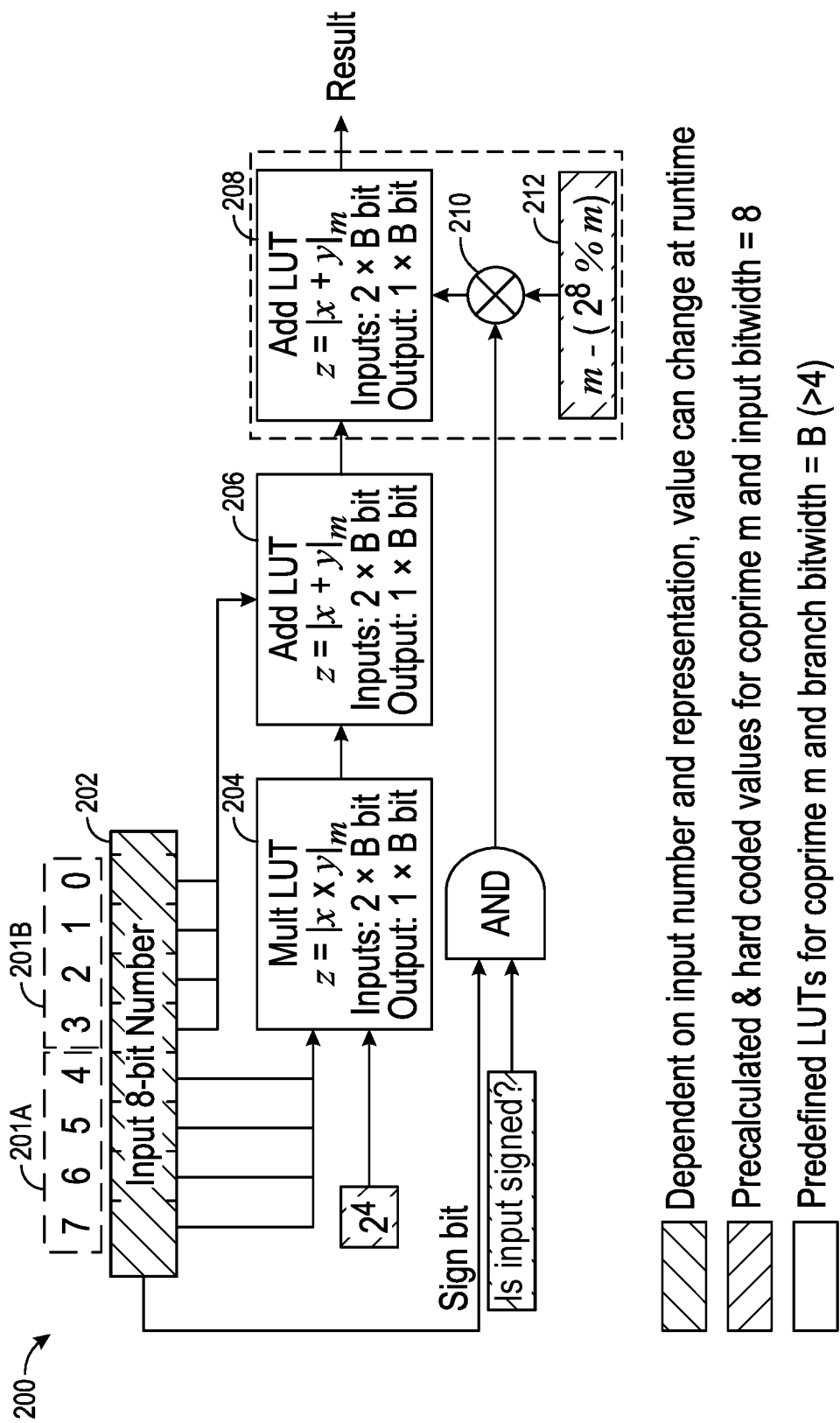
FIG. 2 depicts an example pipeline for converting an input from the binary space to the modulo space, according to aspects of the present disclosure.

Aspects of the present disclosure provide techniques and apparatus for performing multiply-and-accumulate (MAC) operations more efficiently.

Generally, neural networks perform inferences based on input data, weights, and activations that may be defined in various types of data. The types of data that a neural network can use to perform inferences may vary in type (e.g., integer or floating point) and in bit size (also referred to as bit width). The computational complexity involved in performing inferences using a neural network may depend on the type and bit size of the data used. For example, integer operations may be less computationally complex than floating point operations due to the manner in which floating point numbers are defined. Further, operations using data having smaller bit sizes may be less computationally complex than operations using data having larger bit sizes. Computational complexity may be a significant limiting factor on the use cases and types of devices that can perform machine learning processing.

Various techniques can be used to reduce the power utilization of multiply-and-accumulate (MAC) units. In some cases, the size of the data processed in a neural network may be reduced. For example, data may be scaled to a smaller range, rounded, quantized into one of a plurality of "bins," or the like. However, these techniques may result in a loss of precision and thus decreased inference performance (e.g., predictive accuracy) relative to inference performance on unmodified input data. Further techniques may be hardware-specific changes that impose power reductions in hardware at the expense of inference performance, or use smaller geometries for circuitry in hardware to allow for additional circuitry to be used at the same or a similar power budget. However, these techniques generally attempt to increase performance while keeping the input data in its original, raw format.

To allow for reductions in computational complexity while retaining information in input data used in machine learning processing, aspects of the present disclosure provide techniques for performing processing (e.g., inferencing) on data in a modulo space. As discussed in further detail below, a set of coprimes may be used to convert input data into the modulo space, which may be a data space that is significantly smaller than the space in which the input data is received. As used herein, coprimes generally refer to numbers with a single common factor, such that each member of the set of coprimes has a highest common factor of one, and may also be known as relatively prime or mutually prime numbers. Various mathematical operations can be performed (e.g., for processing machine learning model data) through one or more multiply-and-accumulate (MAC) units using the data in the modulo space. These operations may be performed more efficiently and with less power than operations performed on the raw input data, as the data in the modulo space may be significantly smaller than the raw input data. After operations that can be performed in the modulo space are completed, thus resulting in the generation of a modulo-space result, the modulo-space result may be converted back into the original data space in which the input was received (e.g., in the binary space) with minimal loss in data integrity. Accordingly, significantly improved efficiency in processing operations may be achieved using the aspects described herein, which beneficially reduce processing power, processing time, processing hardware area, and the like.

Aspects Related to Modulo-Space Operations

A dot product, or vector inner product, of two matrices, a and b, is a frequent operation in machine learning model processing (e.g., for convolutional neural network models and/or other types of neural network models). A dot product may be performed according to the equation:

$$a \cdot b = \Sigma_{i=0}^{N-1} a_i b_i$$

In some cases, the number of elements N in the matrices a and b may be large (e.g., 128, 256, 512, 1024, etc.), meaning that many multiplication and addition operations may be performed to generate a single scalar value. Generally, multiplications may be more computationally expensive than additions, and as discussed, operations using larger bit sizes may be more computationally expensive than operations using smaller bit sizes. As bit sizes increase, computational complexity may increase such that increases in power and decreases in speed scale more than linearly (e.g., doubling the bit size results in power utilization that is more than doubled and in processing speed that is more than halved).

To reduce the complexity of mathematical operations and break the nonlinear scaling in computational expense as input bit size increases, aspects of the present disclosure leverage properties of modulo math to reduce the size of data used in processing machine learning data, such as inference operations in a neural network. Modulo math generally results in the calculation of a residue from a division operation of an input value and a divisor. Given an input value x and a divisor m, x mod m=$|x|_m$, and the input value x may be represented by the equation:

$$x = n \times m + r \rightarrow |x|_m = r$$

where n is an integer representing the number of times m can be multiplied without exceeding the value of x, and r is an integer representing the residue (also referred to as the remainder) of x÷m, where $0 \leq r < m$. In the modulo space, the following operations are true:

$$|A \pm B|_m = ||A|_m \pm |B|_m|_m$$

$$|A \times B|_m = ||A|_m \times |B|_m|_m$$

That is, the sum or difference of two numbers A and B, modulo m, is equal to the sum of A modulo m and B modulo m, modulo m. Likewise, the product of two numbers A and B, modulo m, is equal to the product of A modulo m and B modulo m, modulo m.

A set of residues $R=\{r_0, r_1, \ldots, r_{N-1}\}$ with respect to a set of N coprimes $\{m_0, m_1, \ldots, m_{N-1}\}$ may be used to represent a number X in the modulo space. The set of coprimes may be a set of numbers for which the greatest common divisor (GCD) is 1, such that $GCD(m_i, m_j)=1 \; \forall i \neq j$. Each value of r may be the residue generated by a corresponding coprime, such that $r_i = |R|_{m_i}$, $i = \{0, \ldots, N-1\}$.

The Chinese remainder theorem states that the set of residues R maps uniquely to a single number in the range of numbers $0 \leq r < M$, where M represents the dynamic range (or range of supported values) of a space defined by the set of coprimes $\{m_0, m_1, \ldots, m_{N-1}\}$. The dynamic range of the set of coprimes may be represented by the equation $M = \Pi_{i=0}^{N-1} m_i$. Because of this property, integers spanning any range of size M may be represented uniquely based on a set of residues generated for an input. This may allow for signed or unsigned data to be represented in the modulo space, allowing for a compact representation of data used in performing various mathematical operations through one or more modulo-space multiply-and-accumulate (MAC) units used by a neural network. It should be noted that other mappings may be used between a set of residues R and a single number in a range of numbers which may include both positive and negative numbers and need not be symmetric.

To perform mathematical operations in the modulo space and leverage the ability of a set of residues to represent a number with a range of numbers M, two numbers A and B may be converted into sets of residues based on a set of coprimes. Let $A = \{a_0, a_1, \ldots, a_{N-1}\}$ and $B = \{b_0, b_1, \ldots, b_{N-1}\}$ represent A and B in the modulo space with respect to the set of N coprimes $\{m_0, m_1, \ldots, m_{N-1}\}$, where each coprime corresponds to a "branch" of the set of coprimes. Mathematical operations may be performed on each branch so that any mathematical operation between A and B is performed as a mathematical operation between $a_0$ and $b_0$ through $a_{N-1}$ and $b_{N-1}$. That is, an addition or subtraction operation with respect to A and B may be represented according to the equation:

$$A \pm B = \{|a_0 \pm b_0|_{m_0}, |a_1 \pm b_1|_{m_1}, \ldots, |a_{N-1} \pm b_{N-1}|_{m_{N-1}}\},$$

and a multiplication operation with respect to A and B may be represented according to the equation:

$$A \times B = \{|a_0 \times b_0|_{m_0}, |a_1 \times b_1|_{m_1}, \ldots, |a_{N-1} \times b_{N-1}|_{m_{N-1}}\}.$$

Each branch may have a smaller bit size (or bit width) than A and B. Further, described, each branch is independent of other branches (e.g., do not have cross terms). Because each branch is independent, each branch may be processed in parallel, and a mathematical operation need not wait for one branch to be completed in order to proceed to the next branch.

At some point in time, data may be converted from the modulo space back to another representation, such as a binary-space representation. To convert a set of residues $R = \{r_0, r_1, \ldots, r_{N-1}\}$ back to the binary-space representation of an input X, the following equation may be used:

$$X = |\Sigma_{j=0}^{N-1}(|\gamma_j \times r_j|_{m_j} M_j)|_M = |\Sigma_{j=0}^{N-1} \pi_j M_j|_M$$

where M represents the dynamic range of the set of coprimes used to generate the set of residues (as discussed above), $M_j$ corresponds to the product of the other coprimes in the set of coprimes such that $M_j = M/m_j$, and $\gamma_i$ is a predefined value, specific to a given set of coprimes, such that $|\gamma_j \times M_j|_{m_j} = 1$. Also, $\pi_j = |\gamma_j \times r_j|_{m_j}$.

$\pi_j$ may be computed using a modulo-space MAC unit, as discussed in further detail below, and $\pi_j M_j$ may be computed using a standard MAC unit. It may be noted that computing modulo M may be a computationally expensive process, as M may be a large value, calculating the sum $\Sigma_{j=0}^{N-1} \pi_j M_j$ may overflow the accumulator, and taking the modulo M of the sum $\Sigma_{j=0}^{N-1} \pi_j M_j$ may be inefficient. To improve the efficiency of converting from the modulo space to the binary space, properties of $\pi_j$ and $m_j$ can be leveraged to avoid overflowing the accumulator and taking the modulo M of the sum. Specifically, because $\pi_j < m_j$, $\pi_j M_j < M$, the sum $\Sigma_{j=0}^{N-1} \pi_j M_j$ may be constructed one term at a time, and if a sum exceeds M, M may be subtracted from the sum. In another example, prior to adding a term, M may be subtracted from the sum if the sum exceeds M. By continually checking the value of the running sum (or intermediate sum) $\Sigma_{j=0}^{k} \pi_j M_j$, where $1 \leq k < N$, and subtracting M from the sum, a modulo operation need not be explicitly performed with respect to $\Sigma_{j=0}^{N-1} \pi_j M_j$ after the final sum is computed, which may reduce the computational complexity of converting a value from the modulo space to the binary space.

FIGS. 1A and 1B illustrate a table 100 of sets of coprimes that can be used in converting an input into the modulo space and to perform mathematical operations in the modulo space, according to aspects of the present disclosure.

As illustrated, sets of coprimes may be defined for any number of bits. In table 100, sets of coprimes are defined for bit widths (or bit sizes) between 2 bits and 6 bits, though it should be understood that sets of coprimes may be defined for any bit width. For each bit width, a variable number of coprimes may be defined. Generally, as illustrated in example 100, as the bit width increases, the number of unique sets of coprimes may also increase. Each set of coprimes for a given bit width may have a different dynamic range of supported numbers, which generally increases as the number of coprimes in a set of coprimes increases. For example, for a bit width of 5 bits for the set of coprimes, and for 6 branches in the set of coprimes, 30 total bits may be used to represent a dynamic range of over 446 million values (or at least 28 bits of dynamic range), without performing mathematical operations using 28 bit inputs. Thus, it can be seen that conversion of inputs into a modulo space may allow for very compact representations of data to represent large numbers of data while allowing for rapid computation of data due to the low bit size of each residue in the modulo space.

In some aspects, a processor may be configured with a set of coprimes (e.g., from table 100) for use in converting inputs, weights, and activations from the binary space to the modulo space. The design of the processor may be influenced by the selected set of coprimes. For example, a number of parallel modulo-space multiply-and-accumulate (MAC) units implemented in the processor may be determined by the set of coprimes with which the processor is configured. For a choice of six 5-bit coprimes, thus, six 5-bit modulo-space MAC units may be implemented in the processor, and as discussed in further detail below, may be selectively activated or deactivated based on the dynamic range that may be called for in order to represent any specific input (or class of inputs). For a choice of five 6-bit coprimes, likewise, five 6-bit modulo-space MAC units may be implemented in the processor and selectively activated or deactivated.

It should be noted that the selection of coprimes illustrated in table 100 include more coprimes than systems using a fixed number of coprimes. In some cases, systems using a fixed number of coprimes may use a set of three coprimes $\{m_0, m_1, m_2\}$ taking the form $\{2^k-1, 2^k, 2^k+1\}$ for ease of conversion between binary space and modulo space. Further, the sequence $\{2^k-1, 2^k, 2^k+1\}$ may include one odd number that is a multiple of 3 and an even number that is a multiple of 2, which may limit the choice of coprimes that may be included in the set of coprimes $\{m_0, m_1, m_2\}$. Further, the number of bits used to represent coprimes in the set of coprimes $\{m_0, m_1, m_2\}$ may not be consistent. Unlike these systems, any number of coprimes may be used, which may allow for increases in dynamic range, increased parallelization, and power usage and processing speed improvements. Further, the coprimes need not take the form $\{2^k-1, 2^k, 2^k+1\}$, but may instead be any number of coprimes (with values associated with a number of branches and a number of bits used to represent these coprimes) that provides sufficient dynamic range for a given compute task (e.g., processing a layer of a neural network) and may include coprimes selected to equalize processing complexity across different branches in the set of coprimes. Further, because any number of coprimes may be used in processing data in the modulo space, additional branches for additional coprimes may be added or removed dynamically to further increase the dynamic range over which data is processed at any given layer of a neural network.

Example Modulo-Space Multiply-and-Accumulate Units

To leverage the ability of data in the modulo space to represent large numerical spaces using a number of small bit size residues, aspects of the present disclosure provide for the conversion of inputs into the modulo space and processing of these inputs in the modulo space (e.g., for machine learning computations, such as processing one or more layers in a neural network). A result calculated in the modulo space may be converted from the modulo space to the binary space for use in operations that do not support the use of data in the modulo space (e.g., operations performed in specific layers or portions of a neural network) without sacrificing the accuracy of the input data and the intervening calculations performed on the input data to generate an output (e.g., used by these portions of the neural network). As used herein, the binary space generally refers to a space in which numbers are represented in two's complement. The binary space may support signed or unsigned data, which may be indicated by a signed magnitude in one's complement (e.g., using a bit with a value corresponding to a positive number and an opposite value corresponding to a negative number).

Various techniques in hardware may be used to convert a value (e.g., an input on which an inference is to be performed, a weight, an activation, etc.) from the binary space to the modulo space. In one example, the residue may be calculated based on a series of addition operations. For a given coprime with a given bit size, residuals for each bit above the given bit size may be pre-calculated and stored in a lookup table or other structure for retrieval. The sum of the residuals for each bit above the given bit size may be calculated, and addition and subtraction operations for each of these residuals, gated on a per-bit basis, may result in the residue for the value.

In another example, an input may be split into two portions, and the residue may be calculated based on these two portions. This may be used, for example, when the input has a significantly larger bit size than a bit size of the modulo branch. Consider, for example, a 9-bit input and a 6-bit modulo branch. The 9-bit input may be split, for example, into a 5-bit top portion and a 4-bit bottom portion, both of which may be residues of the 6-bit modulo branch since both the top portion and the bottom portion are smaller than the modulo branch. The value of the bottom portion may be added to the value of the top portion, multiplied by the size of the bottom portion. As an illustrative example, suppose that a residue is calculated for an input value of $505_{10}$, represented in binary as $111111001_2$, and a modulo branch of $55_{10}$. The input value may be split into a five-bit portion $11111_2$ and a four-bit portion $1001_2$. The residue for the five-bit portion, multiplied by $16_{10}$ ($2^4$), modulo $55_{10}$, may be calculated, and then added to the value of the bottom four-bit portion $1001_2$. Because this sum, by definition, is smaller than the size of the modulo branch, the sum of the four-bit portion and the residue calculated for the five-bit portion may be the calculated residue for $505_{10}$ mod $55_{10}$. Further, this may allow for reuse of a modulo-space MAC unit configured to perform mathematical operations in the modulo space. It should be noted, however, that the split of this 9-bit input discussed above is only an example, and the input may be split at any location in the input.

FIG. 2 illustrates an example pipeline 200 for converting an input from the binary space to the modulo space based on a division of an input into an upper portion and a lower portion. As illustrated, an eight-bit input 202 may be divided into a four-bit upper portion 201A and a four-bit lower portion 201B. The four-bit upper portion 201A may be input, along with the maximum value of the four-bit lower portion 201B (e.g., $2^4$), into a multiplier lookup table 204 that takes two four-bit values as input and returns a four-bit output corresponding to the residue of the product of the inputs and the modulo value. The output of the multiplier lookup table 204 and the bottom four bits 201B of the input 202 may be input into an adder lookup table 206, which returns a four-bit output corresponding to the residue of the sum of the inputs and the modulo value. Finally, another bit, representing a sign of the input 202, is multiplied with a predefined value $m-(2^8\% m)$ 212 at multiplier 210. The output of the multiplier 210 and the adder lookup table 206 is input into adder lookup table 208 to generate the residue (R) for the input 202 and the value of a coprime (m) for which the pipeline 200 is configured.

Figure 3:
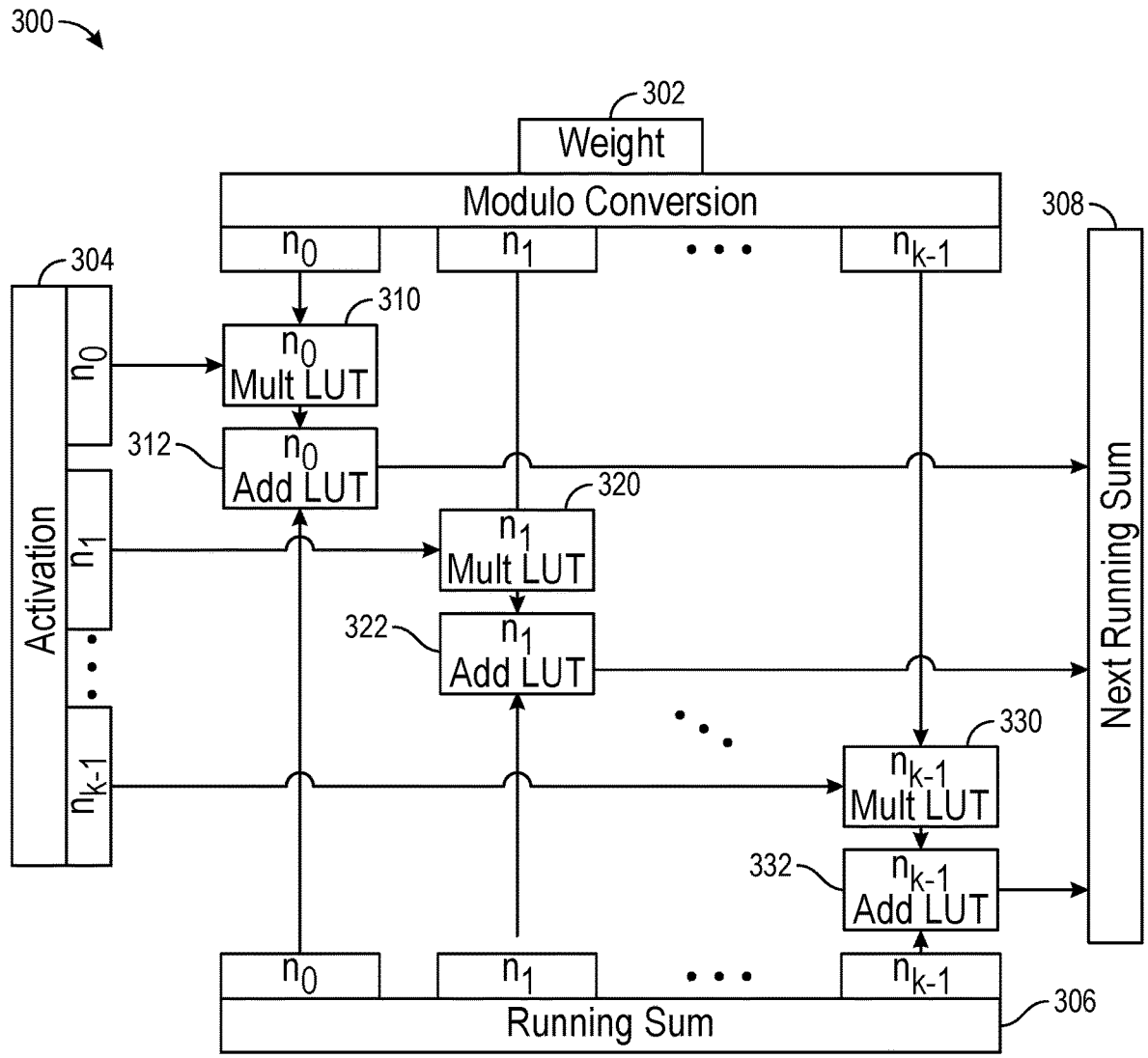
FIG. 3 depicts an example pipeline for generating a result for a layer of a neural network using data in the modulo space, according to aspects of the present disclosure.

FIG. 3 illustrates an example pipeline 300 for generating a result for a layer of a neural network using data in the modulo space, according to aspects of the present disclosure. As illustrated, the pipeline 300 may be defined for one of a plurality of branches (or coprimes) (e.g., a specific m from a set of coprimes M) defined for the set of coprimes used in converting binary-space values to the modulo space and may include k stages for k pairs of weights and activations. Weight parameters 302 may be in the modulo space or may be converted to the modulo space if desired, and activation values may be input into the pipeline 300 as values in the modulo space. For i=0, the weight and activation values may be multiplied using a multiplier 310, and the output of the multiplier 310 and the current running sum 306 for k=0 may be added at adder 312. The output of the adder 312 may be output as the next running sum 308 for k=0. Similar operations may be performed for k=1 at multiplier 320 and adder 322, and so on, through i=k−1 at multiplier 330 and adder 332.

Figure 4:
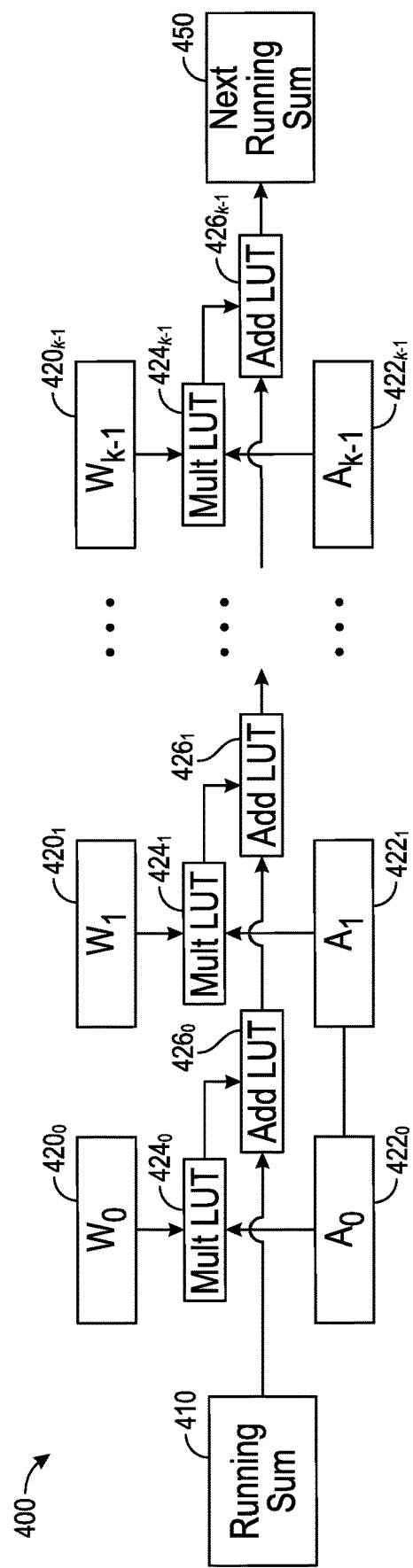
FIG. 4 depicts an example pipeline for generating a result for a layer of a neural network using data in the modulo space, according to aspects of the present disclosure.

FIG. 4 illustrates an example pipeline 400 for generating a result for a layer of a neural network using data in the modulo space (e.g., for a specific m from the set of coprimes M), according to aspects of the present disclosure. In the pipeline 400, the product of the weights 420 and the activations 422 for each k=0, 1, . . . , k−1 may be calculated at the corresponding multipliers 424. It should be understood that the weights 420 and activations 422 are exemplary, and additional weights may not be shown and may be indicated by the ellipsis in FIG. 4. An input running sum 410 and the output of the multiplier $424_0$ may be input into adder $426_0$ to generate a first intermediate sum. The first intermediate sum and the output of the multiplier $424_0$ may be input into adder $426_1$ to generate a second intermediate sum. Similar operations may be executed for each stage k until the output of the multiplier $424_{k-1}$ and a final intermediate sum are added at adder $426_{k-1}$ to generate the next running sum 450.

In both the pipeline 300 and the pipeline 400, multiplication and addition operations may be performed in the modulo space. To facilitate performance of these operations in the modulo space, the adders 312, 322, 332 and the multipliers 310, 320, 330 illustrated in FIG. 3 and the adders 426, 436, 446 and the multipliers 424, 434, 444 illustrated in FIG. 4 may be structured as lookup tables. These lookup tables may receive, as input, two values of a number of bits B and output a result mapped to the two input values. The number of bits B may be defined according to the equation $B=\lceil \log_2(m) \rceil$, where $\lceil \cdot \rceil$ is the ceiling operation (e.g., an operation that rounds up to the next nearest integer). The lookup tables may be defined for any mathematical operation for which the property $|f(A, B)|_m=|f(|A|_m, |B|_m)|_m$ is true and may include values from 0 through m−1 for each of a plurality of pairs of inputs A, B. By using these lookup tables, which may be fixed or programmable, aspects of the present disclosure can perform various mathematical operations for which the property $|f(A, B)|_m=|f(|A|_m, |B|_m)|_m$ is true in the amount of time taken to find a matching entry in the lookup table (e.g., in O(1) (constant) time, regardless of the size of the lookup table), which may provide significant time and power savings versus performing addition and multiplication operations through typical adder and multiplier circuits.

The lookup tables used to implement the modulo-space MAC units described herein may be fully-enumerated lookup tables for each coprime branch in the set of coprimes. For any given coprime m, the inputs and outputs will be in the range {0, . . . , m−1}. Since the inputs and outputs are each represented by B bits, the lookup table may be fully enumerated for any given coprime branch with inputs in the range of {0, . . . , $2^B$−1}. Further, conversion between the modulo space and the binary space may use these lookup tables, which allows for additional modulo steps to be omitted in lieu of a lookup operation. In some aspects, where the lookup tables are programmable, different branches may be selected or loaded dynamically at runtime, as discussed in further detail below.

As discussed above, lookup tables may be established for any function for which the property $|f(A, B)|_m = |f(|A|_m, |B|_m)|_m$, is true. Thus, lookup tables may be established for other functions used or implemented in neural networks, such as softmax functions, sigmoid functions, tanh functions, and/or other activation functions for which $|f(A, B)|_m = |f(|A|_m, |B|_m)|_m$ is true. For example, a softmax function may be defined according to the following equation:

$$\text{softmax}(\vec{z})_i = \frac{e^{z_i}}{\sum_{j=0}^{n-1} e^{z_j}} = \frac{f(z_i)}{\sum_{j=0}^{n-1} f(z_j)}$$

where $\vec{z}$ represents an input vector, $e^{z_i}$ represents an exponential function for the input vector $\vec{z}$, and $e^{z_j}$ represents an exponential function for the resulting output vector. To build the lookup table for the softmax function, a Taylor series expansion defined by the equation:

$$f(x) = e^x = \sum_{n=0}^{\infty} \frac{x^n}{n!} = 1 + x + \frac{x^2}{2} + \frac{x^3}{6} + \frac{x^4}{24} + \cdots$$

may be used with a sufficient number of terms. In some aspects, the Taylor series expansion may be multiplied by a constant so that each term in the Taylor series expansion is an integer. For example, for a 5-term Taylor series expansion of $e^x$, the constant may be 24. The resulting Taylor series expansion may be defined by the equation:

$g(x) = \text{constant} \cdot f(x)$

In some aspects, the lookup table may include outputs for polynomial functions defined for up to a threshold number of inputs. Generally, additional terms may increase the range of values stored in the lookup table but need not increase the complexity of the lookup table. The lookup table for a softmax function or other polynomial function may generally trade a number of inputs for size and speed of retrieval; a single input lookup table may be smaller and faster than a multi-input lookup table.

In some aspects, the weights may be defined in the binary space and deployed to a device for use in performing inferences using the neural network. Weights may be fixed for a given neural network, while activations may change for each input provided to the neural network. Because activations may change for each input provided to the neural network, activations (or at least an activation input into an initial layer of the neural network) may be converted from the binary space to the modulo space each time an inference is performed. However, because weights may be fixed for a given neural network, efficiencies may be realized by storing the weights in the modulo space instead of converting weights from the binary space to the modulo space each time an inference is performed. Weights may be stored up to the bit size (or bit width) of each coprime in the plurality of coprimes, and weights for different bit sizes may be stored so that different bit sizes can be used, for example, on a per-layer basis. As discussed, because mathematical operations in the modulo space may be performed in constant time (e.g., O(1) time) using lookup tables defined for each coprime of the set of coprimes, weights can be stored for different bit sizes without incurring the computational expense of on-demand conversion to the modulo space and performing mathematical operations using typical arithmetic circuits. It should be noted that weights quantized to the bit size of a branch for the set of coprimes need not be converted, as these weights may already be in the modulo space (e.g., defined as values smaller than the maximum value of the branch), or if fully enumerated lookup tables are used.

While the pipelines illustrated in FIGS. 3 and 4 describe the use of modulo-space multiplication and addition operations in the context of machine learning operations, it should be recognized by one of ordinary skill in the art that the techniques described herein may be applied to other operations in which multiplication and addition operations can be accelerated through the use of data in the modulo space.

Figure 5:
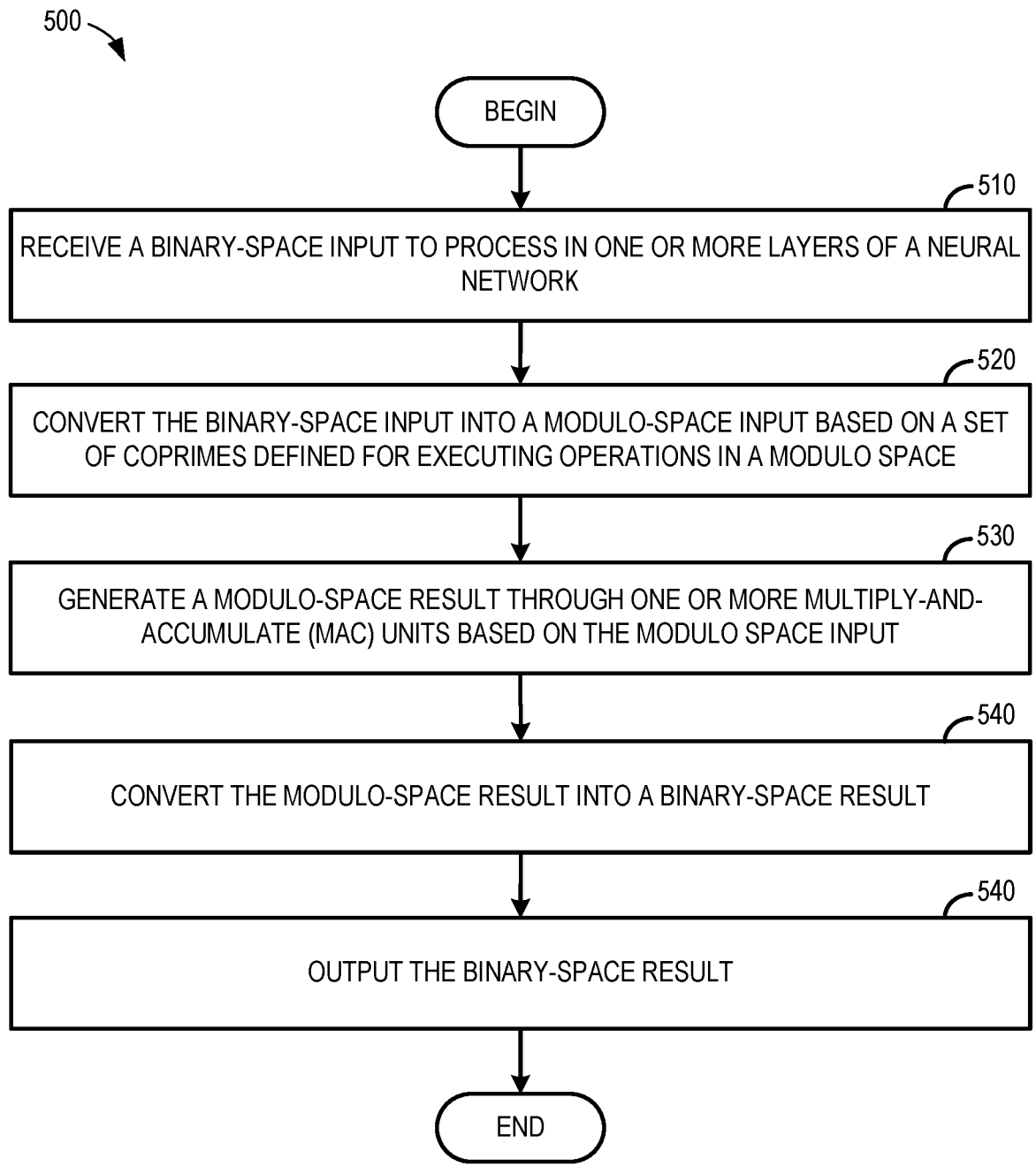
FIG. 5 depicts example mathematical operations using one or more multiply-and-accumulate (MAC) units and inputs converted from the binary space to the modulo space, according to aspects of the present disclosure.

FIG. 5 is a flow diagram for performing mathematical operations 500 (e.g., for neural networks) using one or more modulo-space multiply-and-accumulate (MAC) units and inputs converted from the binary space to the modulo space, according to aspects of the present disclosure. The operations 500 may be performed, for example, by a computing system, such as a user equipment (UE) or other computing device, such as that illustrated in FIG. 6, on which mathematical operations are performed for various tasks. These mathematical operations may include, for example operations defined for a neural network which generates one or more inferences from input data.

As illustrated, the operations 500 may begin at block 510, where a binary-space input is received. The binary-space input may be an input to be processed as part of a machine learning model, such as in a layer of a neural network, and may be formatted in any numerical data type (e.g., short integer, long integer, single precision floating point, double precision floating point, etc.).

At block 520, the binary-space input is converted into a modulo-space input based on a set of coprimes defined for executing operations in a modulo space. In some aspects, the set of coprimes may be statically defined for a processor on which the neural network executes and may include a plurality of coprime numbers. The plurality of coprime numbers may be a set of numbers, up to a given bit size, for which the greatest common denominator is 1. These numbers need not be absolute prime numbers, so long as none of the numbers in the set of coprimes are divisible by any number other than 1. Generally, the maximum value of a coprime may be defined according to the bit size (or bit width) for the coprimes (e.g., a maximum value may be $2^n$, where n represents the number of bits used to represent the coprime). The set of coprimes may include any number of coprimes, each one of the coprimes corresponding to a branch in which one or more actions are performed with respect to the neural network. Generally, the number of coprimes included in the set may correspond to a dynamic range of values that can be represented by the set of coprimes, and the dynamic range may be adjusted by activating and/or deactivating branches of coprimes as called for. Where less dynamic range is called for, coprime branches may be deactivated (e.g., by deactivating branches with coprimes above a threshold value or below a threshold value, which may be associated with a number of bits used to represent the threshold value), while where additional dynamic range is called for, previously deactivated branches may be activated.

At block 530, a modulo-space result is generated through one or more modulo-space multiply-and-accumulate (MAC) units based on the modulo-space input. In some aspects, the modulo-space result may be generated based on a modulo-space input, outputs generated for previous layers in a neural network through the modulo-space MAC units, weights in the modulo space, and activations in the modulo space. In some aspects, the weights and other parameters for different layers in the neural network may be previously defined, and to minimize (or at least reduce) an amount of time used to convert these weights from the binary space to the modulo space, may be converted to the modulo space when the neural network is deployed to a computing device or otherwise prior to use in inference operations. For example, the weights may be defined in one or more lookup tables, with values of each weight index being mapped to a residual value defined for one of the plurality of coprimes in the set of coprimes with which a device is configured.

As discussed above, in some aspects, modulo-space results for any given set of inputs may be generated through one or more lookup tables serving as the multiplier and accumulator portions of a modulo-space MAC unit. In some aspects, these lookup tables may be exhaustive lookup tables associating any combination of inputs from 0 through the value of any coprime to a multiplication or addition result (or any other mathematical function for which the property $|f(A, B)|_m = |f(|A|_m, |B|_m)|_m$ is true). By using lookup tables to retrieve the results of a mathematical operation, mathematical operations may be transformed from operations with a computational complexity associated with the number of bits used to represent the inputs to a constant-time operation (e.g., $O(1)$). Thus, aspects of the present disclosure may significantly reduce the computational complexity of mathematical operations in neural networks, resulting in reduced power utilization and increased speed in generating results of inferences.

In some aspects, the modulo-space result may be generated using a subset of the coprimes in the set of coprimes. For the coprimes that are deactivated, null operations may be performed within the modulo-space MAC units associated with these coprimes.

At block 540, the modulo-space result is converted into a binary-space result. The modulo-space result and binary-space result may be single scalar values, arrays of values, a logit function, or other result that can be generated by one or more layers of a neural network. In some aspects, the conversion of the modulo-space result into a binary-space result may be performed prior to executing a layer in a neural network for which operations in the modulo space may not be supported. For example, the modulo-space result may be converted prior to executing operations in layers of a neural network, such as activation functions or layers for which the property $|f(A, B)|_m = |f(|A|_m, |B|_m)|_m$ is not true. These functions may include, for example, a rectified linear unit (ReLU) function, and the layers may include layers such as max pooling or scaling layers.

At block 550, the binary-space result is output.

In some aspects, different operations using the neural network may use different operational modes with different dynamic ranges. For example, inference operations may use a first set of bit sizes (e.g., 8-bit weights, 8-bit activations, and 24-bit accumulation), while on-device training may use a second set of bit sizes (e.g., 16-bit weights, 16-bit activations, and 48-bit accumulation). To support both inference and training operations using the same configured set of coprimes (as both inference and training can be represented as multiplication and addition operations, for which the property $|f(A, B)|_m = |f(|A|_m, |B|_m)|_m$ is true), different branches (e.g., coprime paths associated with one of the coprimes in the configured set of coprimes) may be activated or deactivated as desired (e.g., activated as additional dynamic range is desired and deactivated when less dynamic range is called for). For example, assume that six bits are used to represent coprimes in the set of coprimes (e.g., the largest coprime is 64). To support up to 48 bits of dynamic range for on-device training (e.g., a backward pass through the neural network), the set of coprimes {43, 47, 49, 53, 55, 57, 59, 61, 64} (as illustrated in FIG. 1B) may be used, as this set of coprimes supports up to 51 bits of dynamic range (and thus higher precision than inference operations, as discussed in further detail below). The training may, for example, be based on backpropagation of one or more modulo-space representations of a gradient of an error function. However, for inference operations (e.g., a forward pass through the neural network), a smaller number of coprimes may be used. For example, the set of coprimes {55, 57, 59, 61, 64}, having a dynamic range of 29 bits (as illustrated in FIG. 1B) may be used. The branches to activate or deactivate may be defined from the head of the set (e.g., the coprimes with the smallest values) or the tail of the set (e.g., the coprimes with the largest values) and may be a design choice defined at the processor level.

Aspects of the present disclosure may support single instruction, multiple data (SIMD) operations. To do so, branches (or coprimes) may be split into multiple parallel and independent operations. For example, assuming that six branches are supported in hardware, operations may be performed as a single six-branch operation, two three-branch operations, or three two-branch operations. These branches may use the same branch modulo or a different branch modulo, and operations may use a variable number of branches. The branches may be adaptively split so that the dynamic range, and thus, the effective data type, for each simultaneous operation is approximate the same or intentionally different, based on the use case, for example.

In some aspects, division and data scaling may be supported in the modulo space. While division operations generally are not operations for which $|f(A, B)|_m = |f(|A|_m, |B|_m)|_m$ is true, scaling by one of the coprimes in the set of coprimes may be practical. For example, scaling may be performed based on the $2^n$ coprime in the set of coprimes. To do so, the coprime branch associated with the $2^n$ coprime may be used to identify branches that are divisible by $2^k$, where $k<n$. If a residue is not divisible by $2^k$, a number may be added or subtracted across each of the coprimes in the set of coprimes such that the residue is divisible by $2^k$. Then, to scale the residues for the $2^n$ coprime, the residues may be shifted right by k bits, and the upper bits may be masked or zeroed out. For branches associated with other coprimes, the residues may be multiplied by the inverse of $2^k$. In the modulo space, the inverse of a number y may be the number x that satisfies the equation $|y \times x|_m = 1$. For example, for a coprime m=5, the inverse of 2 may be 3. These inverses may be precomputed and stored in one or more lookup tables, which, as discussed above, may transform a multiplication operation into a constant-time operation. If a coprime modulo m is prime, then the current branch may be multiplied by $|scale^{m-2}|_m$; otherwise, the prime factors for the value of a coprime modulo m may be determined according to $$factor = m \times \prod_{i=1}^{p} \frac{a_i - 1}{a_i},$$

and residues for the coprime may be multiplied by factor modulo m.

It should be noted, however, that scaling need not be performed using the $2^n$ coprime. For example, scaling may be performed using a coprime that is next to the $2^n$ coprime, which may result in smaller numbers for which computation is less expensive. Further, a branch associated with a coprime in the set of coprimes may be removed prior to conversion back to the binary space, which may reduce the computational cost by $$\frac{1}{NumOfCoprimes}.$$

Figure 6:
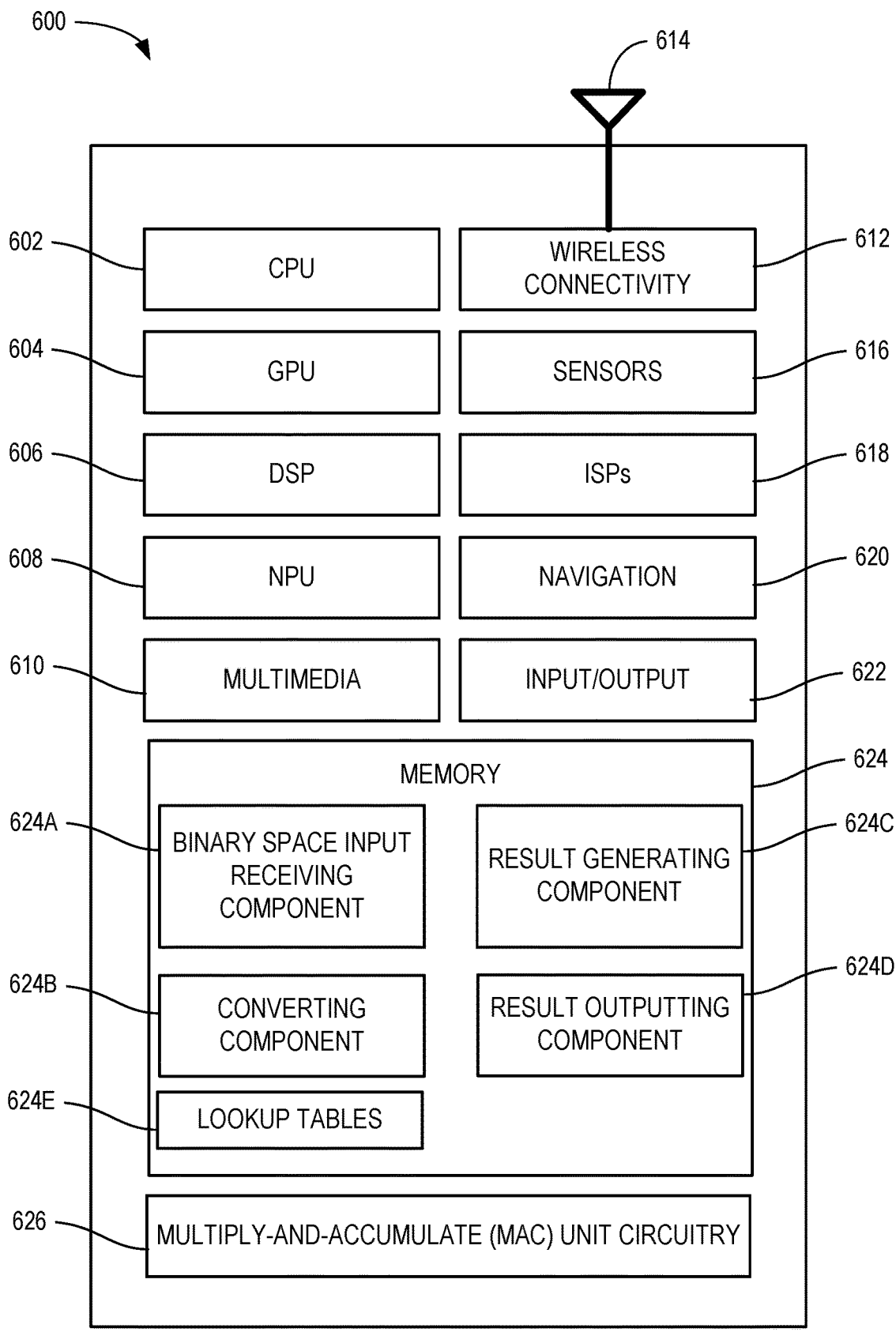
FIG. 6 depicts an example implementation of a processing system on which mathematical operations are performed using one or more MAC units and inputs converted from the binary space to the modulo space, according to aspects of the present disclosure.

Example Processing Systems for Performing Mathematical Operations Using Multiply-and-Accumulate Units and Inputs Converted from Binary Space to Modulo Space FIG. 6 depicts an example processing system 600 for mathematical operations performed using one or more modulo-space multiply-and-accumulate (MAC) units and inputs converted from the binary space to the modulo space, such as described herein for example with respect to FIG. 5.

Processing system 600 includes a central processing unit (CPU) 602, which in some examples may be a multi-core CPU. Instructions executed at the CPU 602 may be loaded, for example, from a program memory associated with the CPU 602 or may be loaded from a memory 624.

Processing system 600 also includes additional processing components tailored to specific functions, such as a graphics processing unit (GPU) 604, a digital signal processor (DSP) 606, a neural processing unit (NPU) 608, a multimedia component 610, and a wireless connectivity component 612.

An NPU, such as NPU 608, is generally a specialized circuit configured for implementing control and arithmetic logic for executing machine learning algorithms, such as algorithms for processing artificial neural networks (ANNs), deep neural networks (DNNs), random forests (RFs), and the like. An NPU may sometimes alternatively be referred to as a neural signal processor (NSP), tensor processing units (TPUs), neural network processor (NNP), intelligence processing unit (IPU), vision processing unit (VPU), or graph processing unit.

NPUs, such as NPU 608, are configured to accelerate the performance of common machine learning tasks, such as image classification, machine translation, object detection, and various other predictive models. In some examples, a plurality of NPUs may be instantiated on a single chip, such as a system on a chip (SoC), while in other examples the NPUs may be part of a dedicated neural-network accelerator.

NPUs may be optimized for training or inference, or in some cases configured to balance performance between both. For NPUs that are capable of performing both training and inference, the two tasks may still generally be performed independently.

NPUs designed to accelerate training are generally configured to accelerate the optimization of new models, which is a highly compute-intensive operation that involves inputting an existing dataset (often labeled or tagged), iterating over the dataset, and then adjusting model parameters, such as weights and biases, in order to improve model performance. Generally, optimizing based on a wrong prediction involves propagating back through the layers of the model and determining gradients to reduce the prediction error.

NPUs designed to accelerate inference are generally configured to operate on complete models. Such NPUs may thus be configured to input a new piece of data and rapidly process it through an already trained model to generate a model output (e.g., an inference).

In one implementation, NPU 608 is a part of one or more of CPU 602, GPU 604, and/or DSP 606.

In some examples, wireless connectivity component 612 may include subcomponents, for example, for third generation (3G) connectivity, fourth generation (4G) connectivity (e.g., 4G LTE), fifth generation connectivity (e.g., 5G or NR), Wi-Fi connectivity, Bluetooth connectivity, and other wireless data transmission standards. Wireless connectivity component 612 is further connected to one or more antennas 614.

Processing system 600 may also include one or more sensor processing units 616 associated with any manner of sensor, one or more image signal processors (ISPs) 618 associated with any manner of image sensor, and/or a navigation component 620, which may include satellite-based positioning system components (e.g., GPS or GLONASS) as well as inertial positioning system components.

Processing system 600 may also include one or more input and/or output devices 622, such as screens, touch-sensitive surfaces (including touch-sensitive displays), physical buttons, speakers, microphones, and the like.

In some examples, one or more of the processors of processing system 600 may be based on an ARM or RISC-V instruction set.

Processing system 600 also includes memory 624, which is representative of one or more static and/or dynamic memories, such as a dynamic random access memory, a flash-based static memory, and the like. In this example, memory 624 includes computer-executable components, which may be executed by one or more of the aforementioned processors of processing system 600.

In particular, in this example, memory 624 includes binary-space-input receiving component 624A, converting component 624B, result-generating component 624C, result-outputting component 624D, and lookup tables 624E. The depicted components, and others not depicted, may be configured to perform various aspects of the methods described herein.

Further, as illustrated, processing system 600 may include modulo-space multiply-and-accumulate (MAC) unit circuitry 626. Modulo-space MAC unit circuitry 626 may include one or more modulo-space MAC units in which mathematical operations in the modulo space may be performed, as described herein.

Generally, processing system 600 and/or components thereof may be configured to perform the methods described herein.

Notably, in other aspects, features of processing system 600 may be omitted, such as where processing system 600 is a server computer or the like. For example, multimedia component 610, wireless connectivity component 612, sensor processing units 616, ISPs 618, and/or navigation component 620 may be omitted in other aspects. Further, aspects of processing system 600 may be distributed, such as training a model and using the model to generate inferences.

Example Clauses

Various aspects of the present disclosure are described in the following numbered clauses.

Clause 1: A method, comprising: receiving a binary-space input for processing; converting the binary-space input into a modulo-space input based on a set of coprimes defined for executing operations in a modulo space; generating a modulo-space result through one or more modulo-space multiply-and-accumulate (MAC) units based on the modulo-space input; converting the modulo-space result into a binary-space result; and outputting the binary-space result.

Clause 2: The method of Clause 1, further comprising converting one or more weight parameters or activations in the one or more layers of a neural network to modulo-space weight parameters or modulo-space activations, wherein the modulo-space result is generated further based on the modulo-space weight parameters or the modulo-space activations.

Clause 3: The method of Clause 1 or 2, wherein converting the binary-space input into the modulo-space input comprises converting the binary-space input into a set of modulus values based on a number of branches defined for the set of coprimes.

Clause 4: The method of Clause 3, further comprising, for each respective layer in a neural network: identifying a respective dynamic range for an output of the respective layer in the neural network; and reducing one or more branches in the set of coprimes for the respective layer based on the respective dynamic range for the output of the respective layer.

Clause 5: The method of Clause 4, wherein reducing the one or more branches in the set of coprimes for the respective layer comprises deactivating branches associated with a number of coprimes larger than a threshold value in the set of coprimes.

Clause 6: The method of any of Clauses 4 or 5, wherein reducing the one or more branches in the set of coprimes for the respective layer comprises deactivating branches associated with a number of coprimes smaller than a threshold value in the set of coprimes.

Clause 7: The method of any of Clauses 4 through 6, wherein a first layer in the neural network uses a number of branches in the set of coprimes associated with a first dynamic range, and a second layer in the neural network uses a number of branches in the set of coprimes associated with a second dynamic range.

Clause 8: The method of any of Clauses 4 through 7, wherein reducing the one or more branches in the set of coprimes for the respective layer comprises deactivating the one or more branches, and wherein deactivating the one or more branches comprises executing null operations in modulo-space MAC units associated with the one or more branches.

Clause 9: The method of any of Clauses 1 through 8, wherein converting the modulo-space result to the binary-space result comprises providing the binary-space result as an input into an activation layer of a neural network.

Clause 10: The method of any of Clauses 1 through 9, wherein converting the modulo-space result to the binary-space result comprises providing the binary-space result as an input into a max pooling layer of a neural network.

Clause 11: The method of any of Clauses 1 through 10, wherein generating the modulo-space result comprises generating a result for each of a plurality of coprimes in the set of coprimes in parallel.

Clause 12: The method of any of Clauses 1 through 11, wherein generating the modulo-space result comprises generating a result based on an entry in a lookup table associated with a coprime and a plurality of input values.

Clause 13: The method of Clause 12, wherein the lookup table is further associated with a type of function for which the lookup table is used to generate a result.

Clause 14: The method of any of Clauses 1 through 13, wherein generating the modulo-space result comprises: generating residual values for bits in the binary-space input above a number of bits used to represent a coprime in the set of coprimes; and calculating the modulo-space result based on the generated residual values.

Clause 15: The method of any of Clauses 1 through 14, wherein generating the modulo-space result comprises: splitting the modulo-space input into a first segment and a second segment based on a number of bits used to represent a coprime in the set of coprimes; calculating a first modulo value for the first segment and a second modulo value for the second segment; and generating the modulo-space result based on the first modulo value and the second modulo value.

Clause 16: The method of Clause 15, wherein: the first modulo value is based on most significant bits of the binary-space input; and generating the modulo-space result based on the first modulo value and the second modulo value comprises generating the modulo-space result based on a product of the first modulo value and 2 to the power of a number of bits of the second segment.

Clause 17: The method of Clause 15 or 16, wherein calculating the first modulo value and the second modulo value comprises retrieving one or more modulo values from a lookup table for a given coprime and the number of bits used to represent the coprime in the set of coprimes.

Clause 18: The method of any of Clauses 1 through 17, wherein generating the modulo-space result comprises generating the modulo-space result based on the modulo-space input and modulo representations of weight parameters for a neural network retrieved from a lookup table.

Clause 19: The method of any of Clauses 1 through 18, further comprising training at least part of a neural network based on backpropagation of one or more modulo-space representations of a gradient of an error function.

Clause 20: The method of Clause 19, wherein the backpropagation of the one or more modulo-space representations of the gradient of the error function is performed using a larger number of coprimes than a number of coprimes used to generate the modulo-space result.

Clause 21: The method of any of Clauses 1 through 20, further comprising: scaling the coprimes in the set of coprimes based on a value of a selected coprime in the set of coprimes, wherein converting the binary-space input into the modulo-space input is based on the scaled coprimes.

Clause 22: The method of Clause 21, wherein the value of the selected coprime comprises a coprime as a power of 2.

Clause 23: The method of any of Clauses 21 or 22, wherein scaling the coprimes in the set of coprimes comprises, for a first coprime in the set of coprimes: generating a residue for the modulo-space input that is divisible by the selected coprime; and shifting the generated residue for the modulo-space input associated with the first coprime by a number of bits associated with the selected coprime.

Clause 24: The method of Clause 23, wherein scaling the coprimes in the set of coprimes further comprises, for coprimes in the set of coprimes other than the first coprime, multiplying the modulo-space input by an inverse of the selected coprime.

Clause 25: A processing system, comprising: a memory comprising computer-executable instructions; one or more processors configured to execute the computer-executable instructions and cause the processing system to perform a method in accordance with any of Clauses 1-24.

Clause 26: A processing system, comprising means for performing a method in accordance with any of Clauses 1-24.

Clause 27: A non-transitory computer-readable medium comprising computer-executable instructions that, when executed by one or more processors of a processing system, cause the processing system to perform a method in accordance with any of Clauses 1-24.

Clause 28: A computer program product embodied on a computer-readable storage medium comprising code for performing a method in accordance with any of Clauses 1-24.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the generic principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A computer-implemented method, comprising:
   receiving a binary-space input for processing;
   converting the binary-space input into a modulo-space input based on a set of coprimes defined for executing operations in a modulo space;
   generating a modulo-space result through one or more modulo-space multiply-and-accumulate (MAC) units based on the modulo-space input;
   converting the modulo-space result into a binary-space result; and
   outputting the binary-space result;
   wherein converting the binary-space input into the modulo-space input comprises converting the binary-space input into a set of modulus values based on a number of branches defined for the set of coprimes.

2. The method of claim 1, further comprising converting one or more weight parameters or activations in a neural network to modulo-space weight parameters or modulo-space activations, wherein the modulo-space result is generated further based on the modulo-space weight parameters or the modulo-space activations.

3. The method of claim 1, further comprising, for each respective layer in a neural network:
identifying a respective dynamic range for an output of the respective layer in the neural network; and
reducing one or more branches in the set of coprimes for the respective layer based on the respective dynamic range for the output of the respective layer.

4. The method of claim 3, wherein reducing the one or more branches in the set of coprimes for the respective layer comprises deactivating branches associated with a number of coprimes larger than a threshold value in the set of coprimes.

5. The method of claim 3, wherein reducing the one or more branches in the set of coprimes for the respective layer comprises deactivating branches associated with a number of coprimes smaller than a threshold value in the set of coprimes.

6. The method of claim 3, wherein reducing the one or more branches in the set of coprimes for the respective layer comprises deactivating the one or more branches, and wherein deactivating the one or more branches comprises executing null operations in modulo-space MAC units associated with the one or more branches.

7. The method of claim 3, wherein a first layer in the neural network uses a number of branches in the set of coprimes associated with a first dynamic range, and wherein a second layer in the neural network uses a number of branches in the set of coprimes associated with a second dynamic range.

8. The method of claim 1, wherein converting the modulo-space result to the binary-space result comprises providing the binary-space result as an input into an activation layer of a neural network.

9. The method of claim 1, wherein converting the modulo-space result to the binary-space result comprises providing the binary-space result as an input into a max pooling layer of a neural network.

10. The method of claim 1, wherein generating the modulo-space result comprises generating a result for each of a plurality of coprimes in the set of coprimes in parallel.

11. The method of claim 1, wherein generating the modulo-space result comprises generating a result based on an entry in a lookup table associated with a coprime and a plurality of input values.

12. The method of claim 11, wherein the lookup table is further associated with a type of function for which the lookup table is used to generate a result.

13. The method of claim 1, wherein generating the modulo-space result comprises:
generating residual values for bits in the binary-space input above a number of bits used to represent a coprime in the set of coprimes; and
calculating the modulo-space result based on the generated residual values.

14. The method of claim 1, wherein generating the modulo-space result comprises:
splitting the modulo-space input into a first segment and a second segment based on a number of bits used to represent a coprime in the set of coprimes;
calculating a first modulo value for the first segment and a second modulo value for the second segment; and
generating the modulo-space result based on the first modulo value and the second modulo value.

15. The method of claim 14, wherein:
the first modulo value is based on most significant bits of the binary-space input; and
generating the modulo-space result based on the first modulo value and the second modulo value comprises generating the modulo-space result based on a product of the first modulo value and 2 to the power of a number of bits of the second segment.

16. The method of claim 14, wherein calculating the first modulo value and the second modulo value comprises retrieving one or more modulo values from a lookup table for a given coprime and the number of bits used to represent the coprime in the set of coprimes.

17. The method of claim 1, wherein generating the modulo-space result comprises generating the modulo-space result based on the modulo-space input and modulo representations of weight parameters for a neural network retrieved from a lookup table.

18. The method of claim 1, further comprising training at least part of a neural network based on backpropagation of one or more modulo-space representations of a gradient of an error function.

19. The method of claim 18, wherein the backpropagation of the one or more modulo-space representations of the gradient of the error function is performed using a larger number of coprimes than a number of coprimes used to generate the modulo-space result.

20. The method of claim 1, further comprising scaling the coprimes in the set of coprimes based on a value of a selected coprime in the set of coprimes, wherein converting the binary-space input into the modulo-space input is based on the scaled coprimes.

21. The method of claim 20, wherein the value of the selected coprime comprises a coprime as a power of 2.

22. The method of claim 20, wherein scaling the coprimes in the set of coprimes comprises, for a first coprime in the set of coprimes:
generating a residue for the modulo-space input that is divisible by the selected coprime; and
shifting the generated residue for the modulo-space input associated with the first coprime by a number of bits associated with the selected coprime.

23. The method of claim 22, wherein scaling the coprimes in the set of coprimes further comprises, for coprimes in the set of coprimes other than the first coprime, multiplying the modulo-space input by an inverse of the selected coprime.

24. A processing system comprising:
at least one memory comprising computer-executable instructions; and
one or more processors configured to execute the computer-executable instructions in order to cause the processing system to:
receive a binary-space input for processing;
convert the binary-space input into a modulo-space input based on a set of coprimes defined for executing operations in a modulo space;
generate a modulo-space result through one or more modulo-space multiply-and-accumulate (MAC) units based on the modulo-space input;
convert the modulo-space result into a binary-space result; and
output the binary-space result;
wherein in order to convert the binary-space input into the modulo-space input, the one or more processors are configured to cause the processing system to convert the binary-space input into a set of modulus values based on a number of branches defined for the set of coprimes.

25. The processing system of claim 24, wherein the one or more processors are further configured to cause the processing system to, for each respective layer in a neural network:
   identify a respective dynamic range for an output of the respective layer in the neural network; and
   reduce one or more branches in the set of coprimes for the respective layer based on the respective dynamic range for the output of the respective layer.

26. The processing system of claim 24, wherein the one or more processors are further configured to cause the processing system to scale the coprimes in the set of coprimes based on a value of a selected coprime in the set of coprimes, wherein the one or more processors are configured to cause the processing system to convert the binary-space input into the modulo-space input based on the scaled coprimes.

27. A processing system comprising:
   means for receiving a binary-space input for processing;
   means for converting the binary-space input into a modulo-space input based on a set of coprimes defined for executing operations in a modulo space;
   means for generating a modulo-space result based on the modulo-space input;
   means for converting the modulo-space result into a binary-space result; and
   means for outputting the binary-space result;
   wherein means for converting the binary-space input into the modulo-space input comprises means for converting the binary-space input into a set of modulus values based on a number of branches defined for the set of coprimes.

28. A non-transitory computer-readable medium comprising computer-executable instructions that, when executed by one or more processors of a processing system, cause the processing system to perform an operation comprising:
   receiving a binary-space input to process;
   converting the binary-space input into a modulo-space input based on a set of coprimes defined for executing operations in a modulo space;
   generating a modulo space result through one or more modulo-space multiply-and-accumulate (MAC) units based on the modulo-space input;
   converting the modulo-space result into a binary-space result; and
   outputting the binary-space result;
   wherein converting the binary-space input into the modulo-space input comprises converting the binary-space input into a set of modulus values based on a number of branches defined for the set of coprimes.

* * * * *